(12) United States Patent
Cato

(10) Patent No.: US 7,337,961 B2
(45) Date of Patent: Mar. 4, 2008

(54) LOCATION DETERMINING SYSTEM WITH ROTATING LASER BEAM AND BAR CODE REFLECTORS

(75) Inventor: Robert Thomas Cato, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 11/021,365

(22) Filed: Dec. 22, 2004

(65) Prior Publication Data

US 2006/0131403 A1    Jun. 22, 2006

(51) Int. Cl.
*G06K 13/06* (2006.01)

(52) U.S. Cl. ...................... 235/383; 235/380

(58) Field of Classification Search ............. 235/475, 235/482–487, 375, 380, 383, 454, 472.01, 235/472.02, 472.03

See application file for complete search history.

(56) References Cited

U.S. PATENT DOCUMENTS

| 5,323,327 | A | * | 6/1994 | Carmichael et al. | ........ | 700/215 |
| 5,371,347 | A |   | 12/1994 | Plesko |   |   |
| 5,519,198 | A |   | 5/1996 | Plesko |   |   |
| 5,778,133 | A | * | 7/1998 | Plesko | ........................ | 385/146 |
| 6,588,669 | B1 |   | 7/2003 | Claus et al. |   |   |
| 6,681,994 | B1 |   | 1/2004 | Koenck |   |   |
| 2004/0056091 | A1 |   | 3/2004 | Overhultz et al. |   |   |

FOREIGN PATENT DOCUMENTS

| JP | 6111142 A | 4/1994 |
| JP | 11232409 A | 8/1999 |

\* cited by examiner

*Primary Examiner*—Karl D. Frech
(74) *Attorney, Agent, or Firm*—Mark E. McBurney; Dillon & Yudell LLP

(57) ABSTRACT

A method and system for providing accurate location of a consumer service device (CSD) in a retail establishment via light modulated by a reflector with a location code. A plurality of location code reflectors (LCRs) are hung from the ceiling of the retail establishment. Each LCR is placed at a preset angle to reflect and modulate a laser beam (or other light source) with a unique location code down to the ground. A laser generation device (LGD) emits a laser beam, which is modulated by the location code when it is reflected off of the LCRs and is reflected to the ground. The modulated laser beam is captured/received by a photo detector/digitizer of the CSD. When the CSD's photo detector/digitizer receives the modulated location code, the location code is utilized to determine an actual physical location of the CSD. The items at that physical location and/or discounts, etc., may be outputted to the consumer.

7 Claims, 5 Drawing Sheets

| Location Code | Physical Location | Items/UPC | Price & Promotions |
|---|---|---|---|
| LocationID1 | Aisle 4, region/area/sub-aisle 3 | Sodas | 6 pack coke $0.99<br>1 Litre $1.99 audio file |
| LocationID2 | Aisle 2, region/area/sub-aisle 1 | Fresh Produce | No promotion |
| LocationIDn | Aisle 3, region/area/sub-aisle 5 | Pasta | Italian risotto $0.25 per bag, limit 3 per customer |

*Fig. 5*

LOCATION DETERMINING SYSTEM WITH ROTATING LASER BEAM AND BAR CODE REFLECTORS

BACKGROUND OF THE INVENTION

1. Technical Field

The present invention relates generally to location determining systems and specifically to location detection via consumer service devices (CSDs). Still more particularly, the present invention relates to a method and system for enabling utilization of a CSD to provide location specific information within retail environments.

2. Description of the Related Art

Consumer service devices (CSDs) are being introduced in various environments to provide assistance to consumers. For example, in retail establishments, CSDs are utilized to provide customers with pre-programmed information specific to the retail establishment as a whole (e.g., which products are discounted on that day, etc.) and thus improve the customers' overall shopping experiences.

Current use of these devices is, however, very limited because of the difficulty in accurately determining the current location of the CSD and providing the customer with location-specific (e.g., on sale/discounted/available items in the vicinity, etc.) information on the fly. Providing location-specific information requires the accurate determination of the location of the CSD device within the establishment.

One existing method for determining the current location of a CSD utilizes infrared (IR) beacons suspended from the ceiling of the establishment. IR beacons (such as provided by Cuesol Corporation) are typically battery powered, and a large number of these IR beacons must be installed in a store in order to obtain the location accuracy desired to assist the consumer. Thus, the total installation cost for this implementation is extremely high. Also, the implementation presents a maintenance problem with frequent changing of batteries for the large number of suspended IR beacons. Hard wiring the beacons to a power source has also been suggested, but the installation is much more labor intensive.

Another method measures the amplitude of the CSD's wireless LAN (local area network) signals when the signals are received at multiple wireless LAN access points to determine the location of the CSD. However, the wireless LAN-based location systems also do not provide the location accuracy desired to be effective.

SUMMARY OF THE INVENTION

Disclosed is a method and system for providing accurate location of a consumer service device (CSD) in a retail establishment via reflected laser beams modulated with location-identifying information. A plurality of location code reflectors (LCRs) are hung from the ceiling of the retail establishment. The LCRs are specially designed reflectors, each containing a unique location code. Each LCR is placed at a preset angle to reflect and modulate a laser beam (or other light source) with its unique location code down to the ground below the respective LCR. A laser generation device (LGD) is provided and emits a laser beam, which is modulated by the location code while being reflected off the LCRs towards the ground. In one embodiment, the location code is a bar code.

The modulated laser beam that is reflected down towards the floor is captured/received by a photo detector/digitizer of the CSD, when the CSD passes in the signal area of the reflected beam. When the CSD's photo detector/digitizer receives the modulated location code, the location code is retrieved and passed to the processor of the CSD, which utilizes the location code to determine an actual physical location corresponding to the location code.

In one embodiment, a table is provided with location code to actual physical location pairings. The table of location code-to-physical location pairings is stored in the memory of the CSD, in one embodiment. In an alternative embodiment, the table is stored in a remote server and the physical location automatically retrieved via a query sent by the CSD to the server via a wireless local area network or other common network.

Once the location is determined, the items at that location and/or discounts, etc. associated with items at the location may be outputted to the consumer via some output mechanism of the CSD. The location may be utilized for other purposes as well.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 5 illustrates an exemplary look-up table pairing unique location codes (of LCRs) to actual physical locations and items at that location, according to tone embodiment of the invention.

DETAILED DESCRIPTION OF AN ILLUSTRATIVE EMBODIMENT

The present invention provides a method and system for providing accurate location of a consumer service device (CSD) in a retail establishment via reflected laser beams modulated with location-identifying information. A plurality of location code reflectors (LCRs) are hung from the ceiling of the retail establishment. The LCRs (which may also be referred to as a laser locator reflector assembly) are specially designed reflectors, each containing a unique location code. Each LCR is placed at a preset angle to reflect a laser beam (or other light source) down to the ground below the respective LCR. A light generation device (LGD) is provided and emits a light beam, which is modulated by the location code when it is reflected off of the LCRs and is reflected to the ground. In one embodiment, the location code is a bar code. Also, in one embodiment, the light emitted is a laser light and the acronym, LGD, is thus interchangeably utilized to also refer to a laser generation device.

The modulated laser beam that is reflected down towards the floor is captured/received by a photo detector/digitizer of the CSD, when the CSD passes in the signal area of the reflected beam. When the CSD's photo detector/digitizer receives the modulated location code, the location code is retrieved and passed to the processor of the CSD, which utilizes the location code to determine an actual physical location corresponding to the location code.

In one embodiment, a table is provided with location code to actual physical location pairings. The table of location code-to-physical location pairings is stored in the memory of the CSD, in one embodiment. In an alternative embodiment, the table is stored in a remote server and the physical location automatically retrieved via a query sent by the CSD to the server via wireless LAN.

Once the location is determined, the items at that location and/or discounts, etc. associated with items at the location may be outputted to the consumer via some output mechanism of the CSD. The location may be utilized for other purposes as well.

Retail Environment

Figure 1:
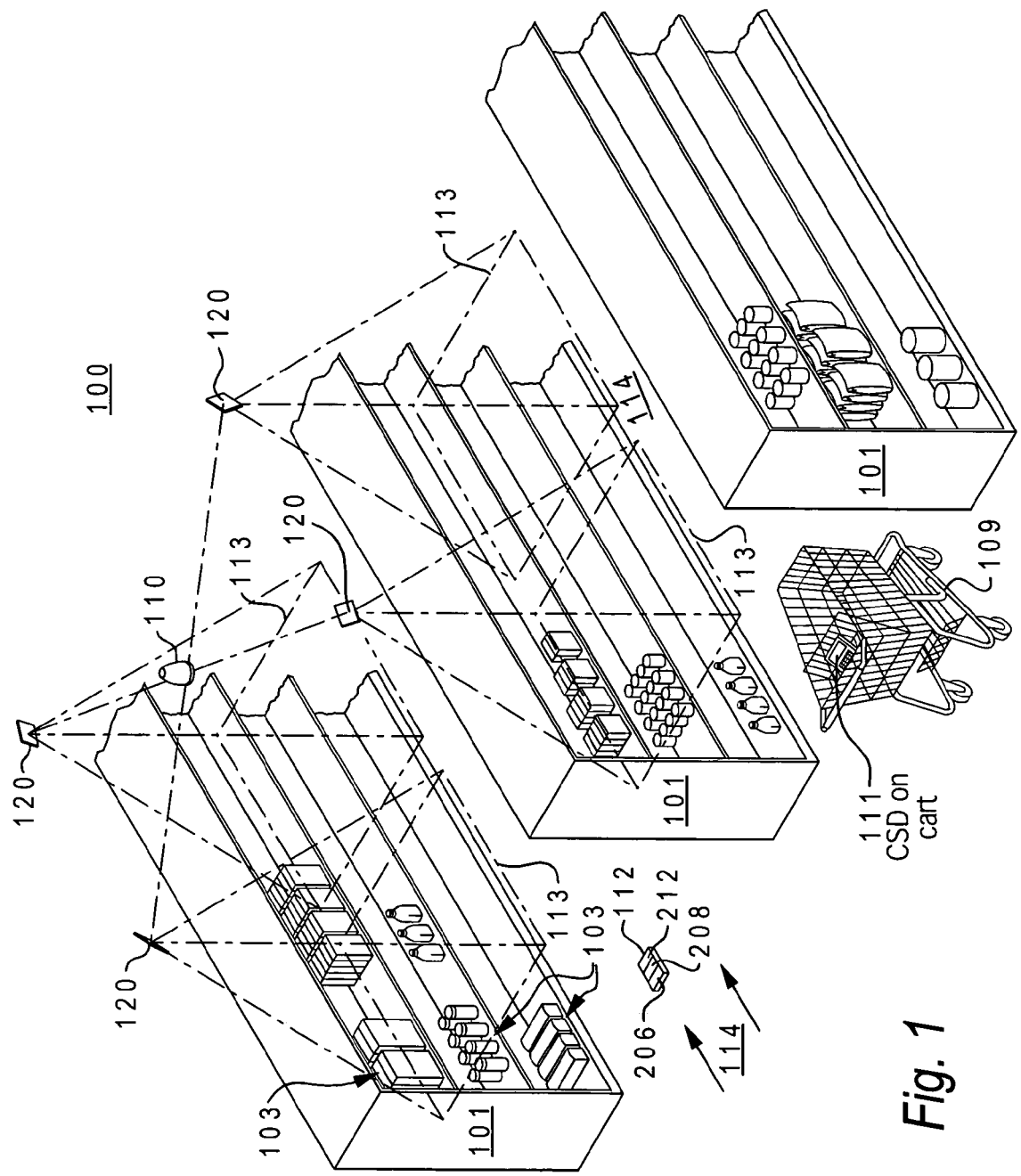
FIG. 1 is a block diagram of an exemplary retail environment equipped with portable consumer service devices (CSDs) for determining the location of the customer and providing other data in accordance with one embodiment of the present invention.

With reference now to the figures, and in particular with reference to FIG. 1, there is depicted an exemplary retail area 100 in which multiple LCRs 120 and one or more light/laser generation device(s) (LGDs) 110 are utilized to provide the location codes that enable CSDs 111 and 112 to provide location-specific information to customers. Retail area 100, depicted as a grocery store-type retailer, includes a plurality of rows of shelving units (or shelves) 101 with products/items 103 placed thereon. An aisle 114 is provided between each row of shelves 101. Located at spaced intervals above each aisle 114 are a number of LCRs 120 (only 2 shown per aisle in the illustration). LCRs 120 may be recessed in or extended/hung from the ceiling (not shown) of the structure housing the retail area 100. The placement (i.e., distance from each other and angle of reflection) of the LCRs 120 within the retail area 100 is calculated reflect light that covers the entire space in which CSD 111, 112 may travel.

Within retail area 100 are placed several LCRs 120, each of which has a different X, Y location coordinate and unique location code (or LCR ID). Only four of these LCRs are illustrated within retail area 100. However, it is understood that the number of LCRs may be vary depending on a plurality of factors including size of retail space 300, size of individual LCRs, strength of signal reflected by each LCR, desired preciseness of location result, strength of the laser beam produced by LGD(s), as well as location of the LCRs relative to the LGD(s), and ceiling height, etc. Each LCR 120 must be in direct line of sight of the laser beam to enable reflection of the location code.

As shown, each LCR 120 reflects light into a signal area 113. These signal areas 113 represent the area in which a location code reflected by the LCR 120 can be received by photo detector/digitizer device 212 of CSD 112). The signal areas 320 may be uniform in shape and size or may be different shapes/sizes depending on the strength of the signal reflected by the particular LCR 120 or the location relative to the LGD 110. For simplicity, the signal areas 320 are assumed to have clearly defined borders. In practical application, however, it is probable that the adjacent signal areas 320 overlap at the shared borders.

FIG. 1 also illustrates two different types of CSDs 111, 112 within retail area 100. The first CSD 111 is physically attached to a customer cart 109 and is provided by the retailer. The second CSD 112 is a portable CSD, which is shown having three main sections, namely photo-detector/digitizer 212, display screen 208 and input/output entry device 206. While either of the CSDs illustrated in FIG. 1 may be utilized, the invention is described hereinafter utilizing the portable representation of CSD 112.

When LGD 110 emits light that is received by LCR 120, LCR 120 reflects the location code into a predefined signal area 113 in the aisle 114 below. In the illustrative embodiment, signal area 113 is an area projected downwards below LCR 120. Different placement of the LCRs 120 may be provided (e.g., on the side of the shelves 101 facing the aisle 114), and the reflection of the location code from the LCR 120 may then vary in shape, size, direction, and strength.

Thus, although the signal area 113 is illustrated as a rectangular-shaped area, it is understood that the signal may be projected to yield a different shaped signal area. For example, LCR 120 may also produce a cone-shaped signal area that covers a circular area of aisle 114 in front of shelves 101. In one embodiment, LCRs 120 are spaced so that the reflected signal area 113 does not intersect with the signal areas of adjacent LCRs 120.

The described embodiment of the invention is directed to a particular application to aid in a retail environment. While other applications are possible, the invention is described hereinafter with this specific implementation for ease of understanding, and no functional limitations are implied by the reference to this specific implementation. Thus, although the invention is being described with reference to its application within a retail environment, use of LCRs and LGDs to determine the location of a device via light modulated by a reflector with a location code may be applied to non-retail environments as well.

Consumer Service Device (CSD)

Figure 2:
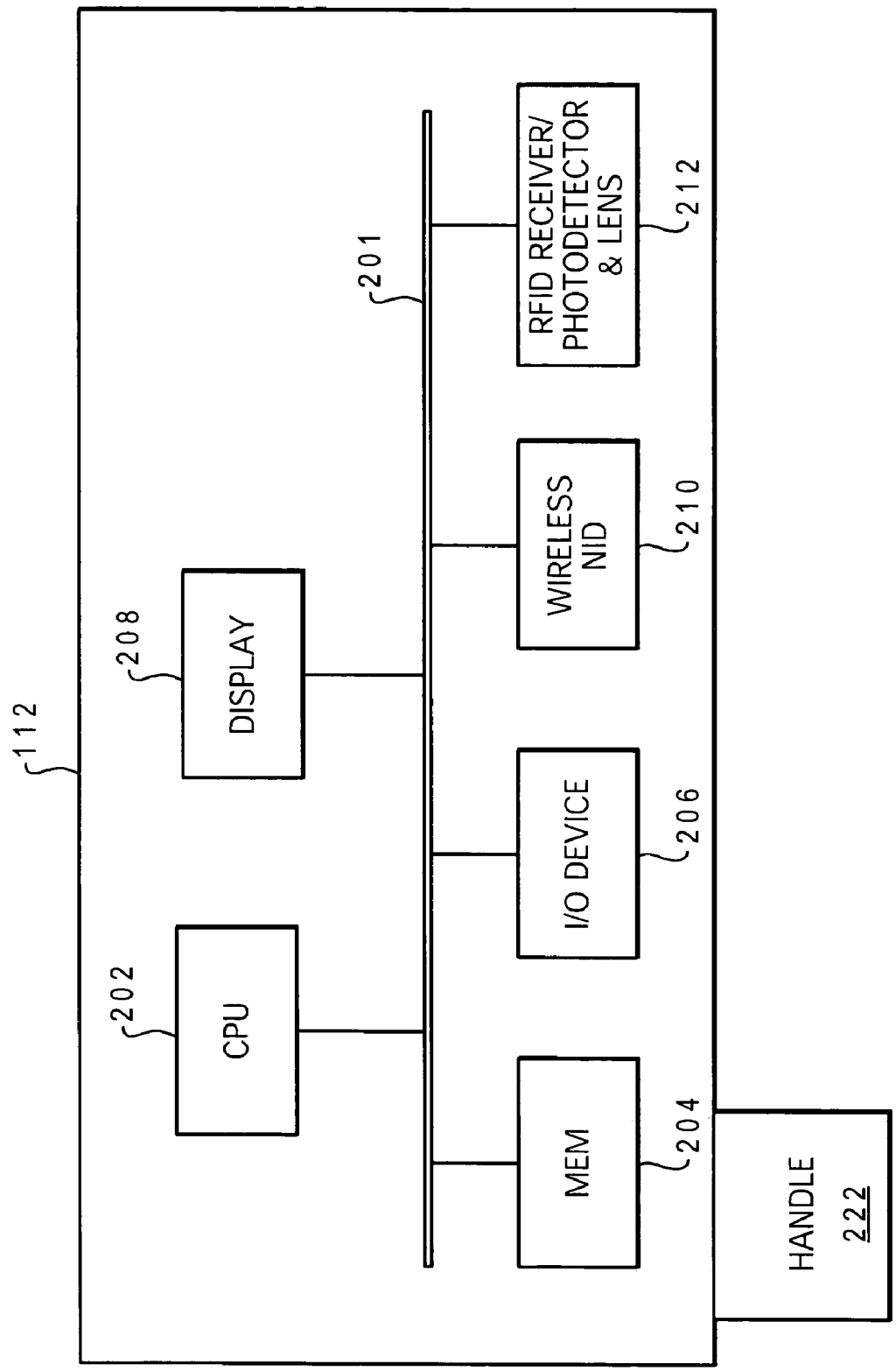
FIG. 2 is a block diagram of internal components of an exemplary CSD with which the location determining and related features of the present invention may be implemented.

FIG. 2 illustrates the basic structure of an exemplary CSD, with internal processing and light detection components. As shown, CSD 112 includes a system interconnect 201 to which is coupled processor (or CPU) 202, memory 204, I/O devices 206 (e.g., keyboard, graphical pointing device, etc.), display monitor 208, and wireless network interface device (NID) 210. CSD 112 also comprises photo detector/digitizer device 212, which is described in greater details below with reference to FIGS. 3A and 3B.

Where information is required to be entered and/or displayed to a user, that information is respectively entered and displayed using the I/O devices 106 and display monitor 108 of CSD 100. Also, in one embodiment, CSD 100 communicates with a remote server via wireless transmission made possible with its wireless NID 110. This communication may involve: a query from the CSD to the server with the location code; a response from the server with the corresponding physical location; and an update of available items and other information stored locally at the CSD.

CSD 112 may have many additional components which are not shown, and may be configured in a different manner than shown. For example, photo detector/digitizer device 212 may be an external component to CSD 112. Also, photo detector/digitizer subsystem may be similar to those utilized in bar code scanners, particularly when the light being reflected is modulated with bar code information corresponding to specific locations.

The configuration illustrated herein is solely for illustration and not meant to place any structural/functional limitations on CSD 112. Also, while referred to herein as CSD 112 to maintain consistency throughout the description, those skilled in the art appreciate the CSD 112 may be a functional component within a larger device/system, such as a webpad, tablet, portable computer, hand held computing device, cellular telephone, etc.

CSD 112 includes software components stored on memory 104 and executed by CPU 102. Among these software components are light demodulation and location determining utility 205, utilized to locate the CSD using the location code. In the illustrative embodiments, CSD 112 also includes items list utility 207 utilized to provide the list of items and/or applicable discounts/specials/coupons at a specific location within a retail environment, as further described below.

Location determining utility 205 and items list utility 207 collectively provide or aid in completing one or more of the following functionality: demodulate received, reflected light that has been modulated with location code; determine/calculate/look-up the specific physical location of the CSD 112; find a list of items and associated discounts, etc. at the specific physical location; and output/signal specific pre-programmed information about the location and/or items found at that location on a user interface of the CSD 112.

LCRs and LGD in Retail Environment

Figure 3A:
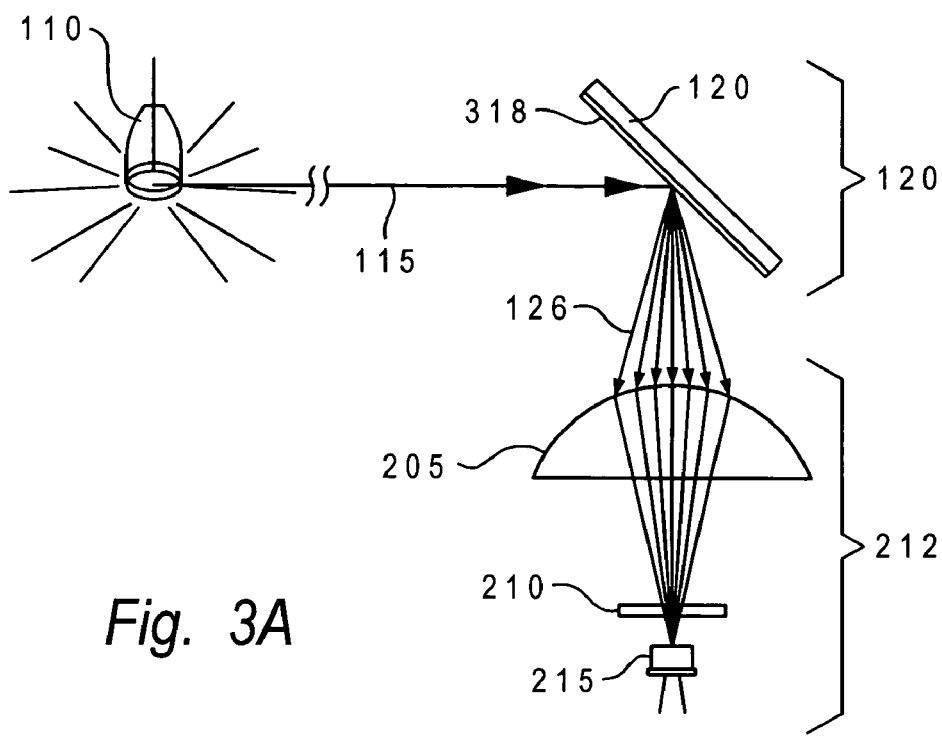
FIGS. 3A and 3B are two perspective diagrams depicting layout of a system that includes a laser beam generation device (LGD), and location code reflector (LCR), and CSD according to one embodiment of the present invention.
Figure 3B:
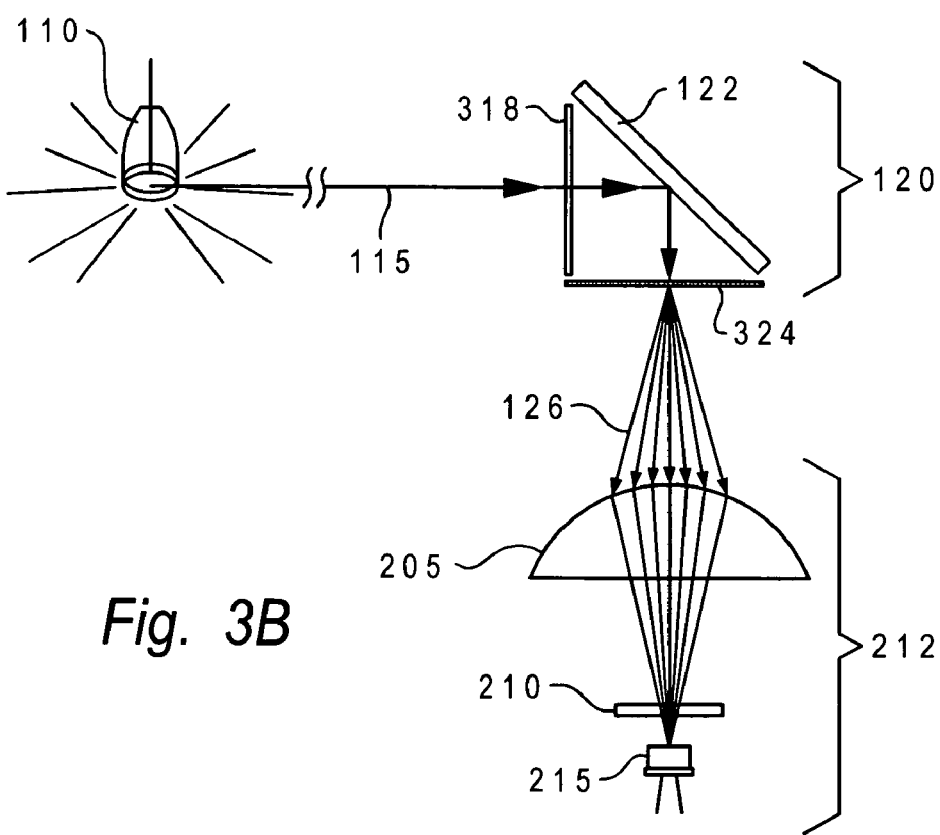

Turning now to FIGS. 3A and 3B, which illustrate two different embodiments of location determining systems such as utilized within FIG. 1. Each embodiment comprises the same basic components, LGD 110, LCR 120 and photo detector/digitizer component 212. LGD 110 generates a light/laser that is received and reflected by LCR 120 down to photo detector/digitizer 212. The number of LGDs 110 within retail area 100 is a factor of several criteria including the size of the area, the number of LCRs 120 and relative spacing of the LCRs, beam strength of the LGD 110, direct line of sight of the LGD 110 relative to LCRs 120 within range of the beam, single directional beam path versus multiple direction (circular) beam path, etc.

LGD 110 provides a single beam that is rotated a preset number of degrees by a reflective surface adjacent to the light source. In one embodiment, the reflective surface is connected to a rotating member that rotates around the light source at an angle that permits the light beam to be reflected in a doughnut or circular orientation around the light source. This configuration enables disbursement/emission of between 0 to 360 degrees of light capable of sequentially hitting multiple LCRs 120 in the rotational path. Also, in one embodiment, the rotating laser beam of LGD 110 hits each of multiple LCRs 120 surrounding the LGD 110 at preset intervals. According to the illustrative embodiment, LGD 110 emits the laser beam along a substantially horizontal path parallel to the ceiling of the retail area.

In one embodiment, the "rotating" laser beam is generated by physically rotating the LGD 110 around a vertical axis. As with the previous embodiment, the LGD 110 emits a single directional beam; However, the LGD 110 is physically rotated a preset number of degrees (e.g., 90 degrees) back and forth around a vertical axes to provide a light source to all LCRs 120 within the rotational path of the directional beam. With a 90 degree rotational path for each LGD 110, four LGDs 110 may be positioned in a central location and directed at different quadrants of a 360 degree area with LCRs 120 positioned in a circular orientation around the LGDs 110.

The configuration with the rotating reflective surface is utilized to disperse the light beam in a circular direction away from the light source. In the illustrative embodiment, LGD 110 generates 360 degree light/laser output along a horizontal axis. In one embodiment, an auto-leveling component (not shown) is included within LGD 110 to maintain LGD 110 at the correct spatial location/angle both horizontally and vertically. This ensures that the laser light hits each of the LCRs 120 within a set input range required for proper reflection of location code down to the photo-detectors below.

The laser beam generated may be in the visible or invisible range of light. As described below, the laser beam may be invisible infrared (IR), in one embodiment. The range of the LGD 110 is dependent on design factors, which include the optics utilized to focus the laser and the desired size of the LCR. The rotating laser beam strikes LCRs (i.e., reflector assemblies), which are mounted under the ceiling at various locations in the store, relative to the laser generation device. When bar codes are being utilized by LCRs 120 to provide the location information, the rotating light/laser beam causes a pulse effect as the light sweeps across each bar of the bar code. This pulse signal emulates that of a bar code scanner, in one embodiment. Thus, in one implementation, LGD 110 may provide a laser beam similar to that of the commercially available Porter-Cable LR1 100.

FIGS. 3A and 3B illustrates two different configurations of LCRs 120. With both embodiments, however, LCR 120 comprises a reflective surface hung from the ceiling at a pre-calculated angle (e.g., 45 degrees). Also, the specific angle at which LCR 120 is positioned is determined by the angle at which the entry beam 115 from LGD 110 hits the reflective surface of LCR 120. Also, the reflector selected for particular LCRs 120 may be convex or concave, in order to control the distribution of the modulated laser beam. In one implementation, a specular (i.e., mirror-like) component is provided that makes it advantageous to control the concentration, shape and direction of the reflected light.

LCR 120 contains a location code that modulates the received (laser) light that is reflected downwards and picked up by a photo detector/digitizer subsystem 212. The location code may be a special bar code, such as a UPC-E with only 4 characters instead of 6, or a 4 character interleaved bar code. This range is provided as a design parameter because only about 2000 discrete locations are needed in most conventional retail environments. The UPC-E format provides high information to physical size ratio. Other codes may be used in alternative embodiments.

In one embodiment, the location code indicates the identity of the LCR itself, which is in turn linked to a physical location. In another embodiment the location code is plugged into an algorithm to yield other information associated with the location.

Reflected light 126, modulated with location code from LCR 120 is dispersed into an area in which a CSD (not shown) equipped with photo detector/digitizer subsystem 212 is present. The amount of dispersion is a function of the type of reflector being utilized and/or the utilization of a light diffuser, as illustrated and described with reference to FIG. 3B. As shown, photo detector/digitizer subsystem 212 comprises a light receiving/collection lens 205, wavelength selective filer 210, and photo detector/digitizer 215.

Depending on implementation, the photo detector/digitizer subsystem 212 may be similar to that utilized in a bar code scanner. Light collection lens 205 focuses light from LCR 120 on to photo detector/digitizer 215. Filter 210 is selective to the wavelength of the laser and is placed in the optical path. Photo detector/digitizer 215 is connected to circuitry, such as amplifier and digitizing circuitry found in bar code scanners. Once the modulated light is received, the CSD utilizes the location code contained therein to look up the physical location of the CSD. In one embodiment, the process of looking up of the physical location is conducted similarly to the manner in which a infrared CSD utilizes the ID of an infrared beacon to look up the physical location of the infrared beacon.

The usable distance between the LCR 120 and the photo detector/digitizer 215 is determined by (among other things) the strength of the emitted light, the electro-optical design of the photo detector 215, and focusing strength of receiving/collection lens 205.

Making specific reference now to the distinctions between the two illustrative embodiments. In the first embodiment, illustrated by FIG. 3A, a unique location code 318 (which may be one of a LCR ID, bar code, or other unique identifier assigned only to that LCR 120) is placed over portions of the reflective surface. The location code 318 may be created utilizing strips/bars placed over a paper reflector or directly over/on a mirror (or other reflective surface). Also, depending on the capabilities/design of the photo detector/digitizer 212 a mirror image of the location code 318 may be provided. In one embodiment, the location code is etched into the surface of the LCR 120 when manufactured.

The invention is applicable irrespective of the specific type of reflective material utilized. However, limitations in the type of material utilized may eliminate some from consideration for particular implementation. For example, since the reflection of a laser beam off paper is not totally diffuse, use of paper material as the LCR is not a preferred embodiment. Thus, placing the location code (e.g., bar codes) over a mirror (rather than paper) provides the largest reflector to CSD distance, and also provides the most accurate location information because the physical area covered by the reflected light is the smallest.

FIG. 3B provides a different configuration of LCR 120 (or LCR assembly) that includes a separate location code layer 318 and diffuser 324. Unlike FIG. 3A, the location code layer 318 is placed a measurable distance in front of the reflective surface 122. Also, a diffuser 324 is position in the path of the reflected light so as to effect a diffusion of the light down towards the signal area. Despite the differences in the configuration, the combination of location code placed over the reflective surface with or without a diffuser is collectively referred to as LCR 120. In one embodiment, location code layer 318 may be opaque with open or transparent slots provided therein, and the combination of opaque and open/transparent areas represents the code.

According to one embodiment, a bar code may be utilized to modulate the laser beam prior to or after reflecting the beam into the signal area in which the CSD passes. The chopped up laser beam would then be reflected down towards the floor by a mirror. A mostly transparent diffuser spreads the modulated laser light before the light leaves the LCR 120. The diffuser increases the size of the usable area of the modulated laser light. That is, the diffuser makes the modulated laser light less directional so that the CSD is able to detect the reflected light without being exactly under the LCR 120. The diffuser trades off location accuracy for a larger area that would be illuminated by the reflected, modulated laser light.

The LCR 120 may be created in multiple ways. Each reflector has a unique bar code associated therewith. The reflector may be convex or concave in order to control the distribution of the modulated laser beam. In one embodiment, the diffuser is replaced by and/or augmented with a lens section or cylindrical lens to help control the distribution of the modulated laser light.

Application of CSD As Shopping Aid

Figure 4:
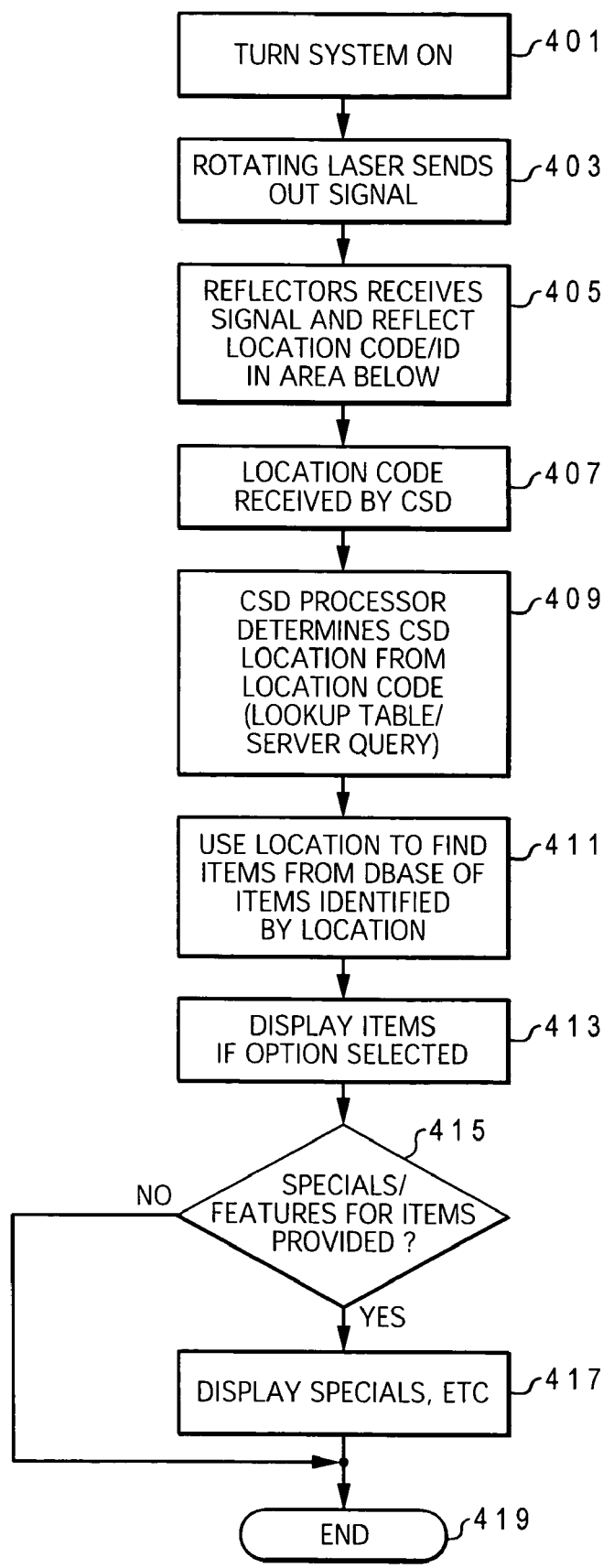
FIG. 4 is a logic flow chart of the process of determining a location of a CSD device using the location code received and outputting location-specific information, according to one embodiment the present invention.

Returning now to FIG. 1, there is also illustrated a shopping cart 109 customized with an CSD 111 that is utilized to aid in locating items in the retail environment 100. The process by which the locating functions are completed is illustrated by FIG. 4. Before the CSD 111 can be utilized to complete the locating functions, the device must first be programmed with a location evaluation utility. This location evaluation utility is an application program that executes on the CPU 202 of the CSD 111 and completes several or all of the following functions: (1) determine/calculate/look-up the specific location of the shopping cart using the received location code(s); (2) find the list of items and associated discounts, etc. within that specific location; and (3) output/signal specific pre-programmed information about items at the location on a user interface of the C SD 111.

With specific reference to FIG. 4, the process begins at block 401 when both LGD 110 and the CSD 112 are "on" in the retail environment. The LGD 110 may be turned on when the retailer opens the retail environment to customers, and once on, the LGD emits light that is reflected and modulated by the LCRs 120 with the location code in the associated signal areas, as indicated at block 403. At block 405, a location codes is received by the photo detector/digitizer 212 of CSD 112, and, at block 407, the location code is demodulated and then forwarded to the location determining utility 205 executing on the processor of CSD. Using the location code, the location determining utility 205 determines the physical location of the CSD at block 409.

This location is then considered the current location of the shopping cart. Notably, determining the location may involve utilizing a look-up table with LCR IDs paired against their physical locations. This look-up table is also a component of the location evaluation utility and is stored in memory of the CSD 209. An exemplary look-up table is illustrated by FIG. 5. As shown, look-up table 500 comprises several rows divided up into columns of information. These columns of information include location code 502, associated physical location 504, list of items 506, and items promotions/discounts 508. Using the location code 502, the corresponding physical location 504 can be retrieved from the look-up table 500. Once the physical location 504 has been identified, the table provides the list of available items 506 in that location as well pricing and other information, such as promotions/discounts 508 associated with specific items. The look-up table may be provided as a software product that allows a potential customer to improve his/her shopping experience with a CSD-enabled shopping cart.

As described above, the CSD 111 or 112 may be attached to the shopping cart or a portable customer unit. Whether the customer purchases/leases CSD 112 or is provided one by the retailer, the CSD operates once the retail area is equipped with the LGD 110 and LCRs 120.

Returning to FIG. 4, once the processor has determined the physical location of the CSD 111 or 112 the location may then be utilized at block 411 to identify items from a database of items listed at that location. These items are then optionally displayed to the customer, as illustrated at block 413. A check is made at block 415 whether there are special discounts, or advertisements, or special features related to an item at that location. If there is some feature associated with one or more of the items in the location, such as a current discount on an item, that feature is outputted to the user (perhaps along with the specific item), as shown at block 417.

For example, the promotion may include a jingle, which is played on the CSD 111 or 112 advertising an item in the location identified by the received location code. Alternatively, a visual advertisement may be displayed on the display of the CSD 111 or 112. The promotion items may be locally stored within memory of the CSD 111 or 112, and updates to these promotions may be provided via wireless transmission from a centralized computer system that includes a master list of items and associated promotions.

One advantage of this invention is that the reflectors are passive components and do not require a battery or wiring. Only the LGD requires power. However, the LGD does not require any communication connectors.

With the embodiment in which the laser is an infrared (IR) laser, a palmtop/handheld computer with built-in IR sensor may be utilized in place of (or as) the CSD 209. The palmtop computer stores the location/item look-up table in memory. The available items with applicable discount or other associated data (e.g., price) are displayed on the palmtop's display screen. The customer is therefore alerted to the presence of the particular product on a nearby shelf or product area and provided all relevant pricing and discount information simultaneously. Typically, palmtop computers are customer owned devices.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   receiving light modulated by a reflector to contain a location code that is being emitted into an area, wherein the light is emitted from a light generation device (LGD) that emits a single directional beam that is rotated a pre-set number of degrees around a vertical axis to hit one or more reflectors positioned around the LGD within range of the single directional beam and wherein the one or more reflectors reflect and modulate the light with a location code to provide a code modulated light;
   deciphering the location code from the modulated light;
   determining the physical location of the area using the location code; and
   outputting information associated with the physical location when the location is determined.

2. The method of claim 1, wherein said determining the physical location includes:
   retrieving a table of location codes paired with a corresponding physical location; and
   looking up the physical location corresponding to the location code.

3. The method of claim 2, wherein the modulated light is received by a portable device with a receiver and said determining the physical location includes:
   transmitting the location code to a remote device; and
   receiving, from the remote device, the information associated with a determined physical location.

4. The method of claim 1, wherein said outputting information includes:
   determining which items are present in the physical location;
   selecting data associated with the item, from among the item's price, applicable discounts, promotions, and specials; and
   outputting said data.

5. A method comprising:
   receiving light modulated by a reflector to contain a location code that is being emitted into an area, wherein the light is emitted from a light generation device (LGD) and reflected by one or more reflectors that reflect and modulate the light with a location code to provide a code modulated light, wherein the one or more reflectors include:
   a reflective surface angled to reflect the light from the LGD into the second area; and
   a physical representation of a unique location code that physically modulates the light, wherein the physical representation is one of: (a) a physical representation placed between the reflective surface and the LGD; (b) a physical representation etched into the reflective surface; and (c) a physical representation placed in the path of the light after the light is reflected by the reflective surface;
   deciphering the location code from the modulated light;
   determining the physical location of the area using the location code; and
   outputting information associated with the physical location when the location is determined.

6. The method of claim 5, wherein said determining the physical location includes:
   retrieving a table of location codes paired with a corresponding physical location; and
   looking up the physical location corresponding to the location code.

7. The method of claim 6, wherein the modulated light is received by a portable device with a receiver and said determining the physical location includes:
   transmitting the location code to a remote device; and
   receiving, from the remote device, the information associated with a determined physical location;
   wherein the portable device is attached to a shopping cart.

* * * * *